(12) United States Patent
Beers et al.

(10) Patent No.: US 12,311,394 B2
(45) Date of Patent: May 27, 2025

(54) METHOD FOR OPERATING A SPRAY FLUID OPERATION SYSTEM FOR AN AGRICULTURAL SPRAYER, A SPRAY FLUID OPERATION SYSTEM, AN AGRICULTURAL SPRAYER, AND A METHOD FOR OPERATING AN AGRICULTURAL SPRAYER

(71) Applicant: Kverneland Group Nieuw-Vennep B.V., Nieuw-Vennep (NL)

(72) Inventors: Johan C. Beers, Nieuw-Vennep (NL); Vincent Korsuize, Nieuw-Vennep (NL)

(73) Assignee: Kverneland Group Nieuw-Vennep B.V., Nieuw-Vennep (NL)

( * ) Notice: Subject to any disclaimer, the term of this patent is extended or adjusted under 35 U.S.C. 154(b) by 454 days.

(21) Appl. No.: 17/707,320

(22) Filed: Mar. 29, 2022

(65) Prior Publication Data

US 2022/0314255 A1   Oct. 6, 2022

(30) Foreign Application Priority Data

Apr. 1, 2021   (EP) .................................... 21166680

(51) Int. Cl.
*B05B 15/20* (2018.01)
*B05B 7/26* (2006.01)
*B05B 12/08* (2006.01)

(52) U.S. Cl.
CPC .............. *B05B 12/081* (2013.01); *B05B 7/26* (2013.01); *B05B 15/20* (2018.02)

(58) Field of Classification Search
CPC ......... B05B 12/081; B05B 7/26; B05B 15/20; A01M 7/0085; A01M 7/0092; A01M 7/0089
See application file for complete search history.

(56) References Cited

U.S. PATENT DOCUMENTS

2013/0320106 A1* 12/2013 Schmidt ................. A01G 25/16
                                                        239/1
2018/0369851 A1* 12/2018 Engelbrecht .............. B05B 1/20

FOREIGN PATENT DOCUMENTS

DE       3824744 A1    2/1910
EP       2789232 B1   10/2016
EP       3085229 B1    1/2018

OTHER PUBLICATIONS

European Search Report in European Application No. 21166680.5, mailed Oct. 7, 2021.

* cited by examiner

*Primary Examiner* — Qingzhang Zhou
*Assistant Examiner* — Joel Zhou

(57) ABSTRACT

A spray fluid operation system for an agricultural sprayer and method for operating same is disclosed. The method comprising: providing a spray fluid in a reservoir; and conveying at least one of the spray fluid and an additional fluid into a fluid flow system by a pump and control system (PCS). The fluid flow system comprising a dispensing device configured to dispense a first pumped fluid from the PCS to a field, and a backflow system configured to pipe second pumped fluid from the PCS back to the reservoir. The method further comprises: determining a fluid level in the reservoir; receiving the fluid level in a control device; generating the second pumped fluid by the PCS; and controlling allocation of the second pumped fluid according to an allocation ratio to: a first return device and a second return device configured to return the second pumped fluid to the reservoir.

12 Claims, 4 Drawing Sheets

METHOD FOR OPERATING A SPRAY FLUID OPERATION SYSTEM FOR AN AGRICULTURAL SPRAYER, A SPRAY FLUID OPERATION SYSTEM, AN AGRICULTURAL SPRAYER, AND A METHOD FOR OPERATING AN AGRICULTURAL SPRAYER

CROSS REFERENCE TO RELATED APPLICATIONS

The present application claims the benefits of priority of European patent application No. 21166680.5 entitled "A method for operating a spray fluid operation system for an agricultural sprayer, a spray fluid operation system, an agricultural sprayer, and a method for operating an agricultural sprayer" filed with the European Patent Office on Apr. 1, 2021, the entire contents of which is hereby incorporated by reference herein.

The present disclosure refers to a method for operating a spray fluid operation system for an agricultural sprayer, a method for operating an agricultural sprayer, a spray fluid operation system for an agricultural sprayer, and an agricultural sprayer.

BACKGROUND

Spray fluid operation systems are applied by agricultural sprayers for dispensing a spray material to the field for agricultural purpose. The spray material is provided in a fluid reservoir (tank). A pump system is applied for pumping the spray material being a fluid from the fluid reservoir to a dispensing flow system having a dispensing device provided with a plurality of dispensing elements configured to dispense the pumped spray material. For example, the dispensing elements may be located on a boom of the agricultural sprayer.

Document EP 2 789 232 B1 discloses a liquid-conveying system for an agricultural sprayer having a self-priming pump and a non-self-priming rotary pump, which on the suction side are connectable to a clear-water suction connector, and which, in a power network and/or hose network which contain valves which are actuatable by way of a controller and which include at least one stock tank. The clear-water suction connector, spray nozzles for deploying the stock, and at least one stock-additive inflow lock are integrated in such a manner that the controller, a filling function, a stock-tank and/or network cleaning function, a stock-tank inflow function, a stock-stirring function, a spraying function and a venting function of the non-self-priming rotary pump are executable. The liquid-conveying system is configured for executing exclusively the cleaning function and the venting function by the self-priming pump and for executing the filling, inflow, stirring and spraying functions by the non-self-priming yet vented rotary pump. The self-priming pump is disposed in a part of the network that conducts clear water and that is separated from a part of the network that conducts stock at least during the execution of the spraying function.

Document EP 2 907 386 B1 refers a liquid delivery system for a field sprayer, having a centrifugal pump and having a self-priming pump at least for venting the centrifugal pump, wherein the two pumps are, on their suction sides, selectively connectable to a clear water suction connection and are integrated into a line network into which valves, which are actuable via a controller, and at least at least one stock tank, the clear water suction connection, spray nozzles of a spray module and a stock additive induction sluice are integrated. At least one stock tank filling function, a cleaning function, an induction function, a stirring function, a spraying function, the centrifugal pump venting function and, if appropriate, an emptying function are settable via the controller. The centrifugal plump venting, the induction and the spraying functions are each executable during the operation of the self-priming pump. The cleaning, the stock tank filling, the stirring and, if appropriate, the emptying functions are at least mainly executable with operation of the centrifugal pump. At least for executing the spraying function and the stirring function, both pumps are simultaneously operable.

EP 3 085 229 B1 refers to a method for controlling the liquid circuit of a distributing machine, comprising: a storage container, in particular liquid tank, for the material to be discharged, in particular sprays; one or more nozzles for discharging the material; an agitator in the interior of the storage container for agitating and/or circulating the material to be discharged, by means of the introduction of the material itself by means of at least one nozzle; a pump for conveying the material to be discharged from the storage container to the at least one nozzle; a first branch of the line between the pump and the at least one nozzle, said branch leading to the agitator and branching off some of the flow of material to the at least one nozzle towards the agitator; a second branch between the pump and the at least one nozzle, said branch conducting some of the flow of material back to the line between the storage container and the pump or to the storage container itself or to a component located in said section, such as, preferably, a filter; a first regulating valve for throttling the volumetric flow between the first branch and the agitator; a second regulating valve for throttling the volumetric flow between the second branch and the line between the storage container and the pump; a first measuring device, in particular pressure-measuring probe and/or flow meter, for measuring the volumetric flow which is discharged directly by the at least one nozzle; at least one second measuring device, in particular pressure-measuring probe and/or flow meter and/or position feedback of at least one of the regulating valves for measuring the volumetric flow from the first branch to the agitator and/or the volumetric flow from the second branch to the line between the storage container and the pump; an electronic control unit for controlling the discharge rate and/or the agitating operation.

Document U.S. Pat. No. 10,631,531 B2 refers to a spray fluid operation system including a fluid flow circuit that provides several sprayer features while using a minimum number of fluid pumps. In an agricultural setting, a first pump (one function of which is filling) is integrated with a second pump (one function of which is spraying) and both located compactly underneath the solution tank. In some embodiments that include only two pumps, they are centrifugal impeller pumps. Each of the two pumps is capable of performing more than one function. Together, they provide self-primed filling, auto dilution, educator rinsing, and so on, in a fluid-isolated manner to avoid fluid contamination

SUMMARY

It is an object to provide a method for operating a spray fluid operation system for an agricultural sprayer and an agricultural sprayer which allow for improved operation control.

For solving the object, a method for operating a spray fluid operation system for an agricultural sprayer according to claim 1 is provided. Further, a spray fluid operation system for an agricultural sprayer and an agricultural sprayer according to claim 11, respectively, is provided. Still, a method for operating an agricultural sprayer of claim 12 is provided. Embodiments are disclosed in the dependent claims.

According to an aspect, a method for operating a spray fluid operation system for an agricultural sprayer is provided, comprising providing a spray fluid in a fluid reservoir, and conveying a fluid comprising at least one of the spray fluid from the fluid reservoir and an additional fluid different from the spray fluid and provided in an additional fluid reservoir into a fluid flow system by a pump and control system. The fluid flow system fluidly is comprising: a dispensing flow system comprising a dispensing device having a plurality of dispensing elements configured to dispense a first pumped fluid received from the pump and control system to a field, and a backflow system fluidly connected to the fluid reservoir and configured to pipe second pumped fluid received from the pump and control system back to the fluid reservoir. The method is further comprising: determining a fluid level of the spray fluid in the fluid reservoir by a level measuring device; receiving measurement data in a control device, the measurement data being indicative of the fluid level determined by the level measuring device; generating the second pumped fluid by the pump and control system; and controlling, by the control device, allocation of at least part of the second pumped fluid according to an allocation ratio dependent on the fluid level to a first return device connected to the backflow system and configured to return the second pumped fluid to the fluid reservoir, and a second return device connected to the backflow system and configured to return the second pumped fluid to the fluid reservoir.

According to another aspect, a spray fluid operation system for an agricultural sprayer is provided, comprising a fluid reservoir configured to receive a spray fluid, and a pump and control system configured to convey or pump a fluid comprising at least one of the spray fluid from the fluid reservoir and an additional fluid different from the spray fluid and provided in an additional fluid reservoir into a fluid flow system, comprising a dispensing flow system comprising a dispensing device having a plurality of dispensing elements configured to dispense a first pumped fluid received from the pump and control system to a field, and a backflow system fluidly connected to the fluid reservoir and configured to pipe second pumped fluid received from the pump and control system back to the fluid reservoir. The spray fluid operation system is further comprising: a first return device connected to the backflow system and configured to return the second pumped fluid to the fluid reservoir; a second return device connected to the backflow system and configured to return the second pumped fluid to the fluid reservoir; a level measuring device configured to determine a fluid level of the spray fluid in the fluid reservoir; and a control device. The spray fluid operation system is configured to: receive measurement data in the control device, the measurement data being indicative of the fluid level determined by the level measuring device; generate the second pumped fluid by the pump and control system; and control, by a control device, allocation of at least part of the second pumped fluid according to an allocation ratio dependent on the fluid level to the first return device, and the second return device.

Further, an agricultural sprayer comprising the spray fluid operation system is provided. According to still another aspect, a method for operating an agricultural sprayer is provided, the method comprising operating the spray fluid operation system according to the above method.

In an operation scenario at least part of the fluid material conveyed or sucked from at least one of the fluid reservoir and the additional reservoir by the pumping device of pump and control system (second pumped fluid) is provided to the backflow system. In such case allocation or distribution of such second pumped fluid to at least one of the first return device and the second return device is controlled in dependence on a current fluid level of the spray fluid in the reservoir detected by the level measuring device assigned to the reservoir.

The second pumped fluid may comprise only spray fluid, thereby, providing a second pumped spray fluid. Alternatively, the second pumped fluid may comprise only the fluid from the additional reservoir which, for example, may be a cleaning or rinsing fluid such as water. Such fluid may provide for diluting the spray fluid in an example. Alternatively, the second pumped fluid may be a mixture of the spray fluid and the fluid from the additional reservoir.

The first pumped fluid may comprise only spray fluid, thereby, providing a first pumped spray fluid. Alternatively, the first pumped fluid may comprise only the fluid from the additional reservoir. Such fluid may provide for diluting the spray fluid in an example. Alternatively, the first pumped fluid may be a mixture of the spray fluid and the fluid from the additional reservoir.

Different functions may be conducted by the first return device and the second return device which are provided as separated device for returning second pumped fluid to the fluid reservoir. Such different functionalities are conducted separately by a degree or an extend which is controlled in dependence on the fluid level detected.

In a first control mode of operation, the second pumped fluid may be allocated according to a first allocation ratio, if the measurement data are indicative a first fluid level. In a second mode of operation, the second pumped fluid may be allocated according to a second allocation ratio different from the first allocation ratio, if the measurement data are indicative of a second fluid level different from the first fluid level.

In an embodiment, according to a first mode of operation, depending on the fluid level detected the fluid may be prevented from being pumped to the first and second return device, because of a first level of fluid. In a second mode of operation, because of a second level of fluid (different from the first level of fluid), there may be second pumped fluid pumped to at least one of the first and second return device.

A mode of operation may be conducted with no first pumped fluid provided, but only the second pumped fluid. Still, second pumped fluid can be allocated between the first and second return device in dependence on the fluid level. For example, such mode of operation may applied if the agricultural sprayer comprising the spray fluid operation system is travelling on headland. Spraying, i.e. dispensing the first pumped fluid may be stopped or interrupted in case of travelling close to some special area, such as water.

The method may further comprising, in the control device: providing threshold data indicative of a threshold fluid level of the spray fluid in the fluid reservoir; and applying at least one of allocating the second pumped according to the first control mode of operation, if the first fluid level is higher than the threshold fluid level, and allocating the second pumped according to the second control mode of operation, if the second fluid level is lower than the threshold fluid level. Depending on whether the measurement data are indicative of a fluid level above or below the threshold fluid level, the first or second control mode of operation is applied. For example, the threshold fluid level may be set in a range between about 50% and about 70% of the maximum fluid level in the fluid reservoir.

With respect to such embodiment or other embodiments, from the measurement data it may be determined whether an output of the first return device provided, for example, with a reservoir spraying device is (still) located above the current fluid level and, thus, being provided outside the spray fluid. In such case at least some of the second pumped fluid may be allocated to the first return device. If it is determined that the (output of the) first return device is in touch with the spray fluid because of having a high fluid level in the fluid reservoir, the second pumped fluid may be prevented from being allocated to the first return device. There may be some specific threshold assigned to the first return device provided in the control device. The second pumped fluid may be prevented from being allocated to the first return device if it is determined that the current fluid level is above the specific threshold. In such case, if the first return device is provided with reservoir spraying device, there may be no need for wetting any inner wall section of the fluid reservoir.

Similarly, there may be another threshold with respect to allocating any of the second pumped fluid to the second return device. If the current fluid level is determined to be below such further threshold, the second pumped fluid may be prevented from being allocated to the second return device. Such further threshold, if the second return device is provided with a fluid agitating device, may ensure that the second pumped fluid is only allocated to the fluid agitating device if (an output of) the fluid agitating device is at least in part immersing into the spray fluid.

The method the controlling by the control device may further comprise at least one of the following: in the first control mode of operation, according to the first allocation ratio allocating an amount of the second pumped fluid to the first return device and allocating another amount of the second pumped fluid smaller than the amount of the second pumped fluid to the second return device; and, in the second control mode of operation, according to the second allocation ratio allocating an amount of the second pumped fluid to the second return device and allocating another amount of the second pumped fluid smaller than the amount of the second pumped fluid to the first return device. Depending on the fluid level detected a majority of the second pumped fluid is allocated to the second return device and the first return device, respectively.

The controlling by the control device may further comprise at least one of the following: in the first control mode of operation, preventing the second pumped fluid from allocating to the second return device; and in the second control mode of operation, preventing the second pumped fluid from allocating to the first return device. For example, the second pumped fluid may be prevented from being allocated to the first return device, if the current fluid level is found to be within some distance threshold of the first return device. The second pumped fluid may be prevented from allocation to the second return device, for example, if from the measurement of the fluid level it is determined that (an output of) the second return device is not immersing into the spray fluid provided in the fluid reservoir.

The method may further comprise allocating an amount of the second pumped fluid to a third return device connected to the backflow system and configured to return the second pumped fluid to the fluid reservoir return the second pumped fluid to the fluid reservoir.

The method may further comprise: generating the first pumped fluid by the pump and control system; providing the first pumped fluid to the dispensing flow system; and dispensing the first pumped fluid by the plurality of dispensing elements to the field. Dispensing of the first pumped fluid by the plurality of dispensing elements may be conducted with providing the second pumped fluid to the backflow system at the same time or at different time. In an embodiment, both the first and the second pumped fluid are generated by the pump and control system and provided to the dispensing flow system and the backflow system, respectively, at the same time. Alternatively, the spray material sucked or conveyed by the pump and control system from the fluid reservoir may be fully provided to the dispensing flow system, for example, after there has been second pumped fluid provided to the backflow system.

The method may further comprise stopping at least one of generating the first pumped fluid and generating the second pumped fluid, if the measurement data are indicative of a lower limit for the fluid level in the fluid reservoir.

The controlling of the allocation of at least part of the second pumped fluid may further comprise, by the control device: controlling operation of a first pump device of the pump and control system, the first pump device configured to provide the second pumped fluid to the first return device; and controlling operation of a second pump device of the pump and control system, the second pump device configured to provide the second pumped fluid to the second return device. Another pump device may be provided with the pump and control system which is configured to provide the second pumped fluid to the third return device. In addition or alternatively, an additional pump device may be provided which is configured to generate the first pumped fluid and provide the first pumped fluid to the dispensing flow system. As an alternative, one or more of the different elements provided to receive at least one of the first pumped fluid and the second pumped fluid may receive pumped fluid from one and the same pump device. Operation of the one or more pump devices can be controlled by the control device. For example, operation control may be applied depended on the measured fluid level.

The controlling of the allocation of at least part of the second pumped fluid may further comprise, by the control device, controlling a multi-port valve, wherein a valve inlet of the multi-port valve is configured to receive the second pumped fluid from the pump and control system and a valve outlet of the multi-port valve is configured to provide the second pumped fluid to at least one of the first return device and the second return device. In an embodiment, the valve outlet of the multi-port valve may be configured to provide or convey the second pumped fluid to the third return device. The multi-port valve may be configured to receive by another valve inlet the first pumped fluid which is to be provided to the dispensing flow system. The multi-port valve may be implemented by one valve or a combination of valves. For controlling the allocation of the second pumped fluid, the control device may provide control signals to at least one of the one or more pump devices and the one or more valves.

The first, second and third return devices may be selected from the following group of return devices: a reservoir spraying device connected to the backflow system and configured to wet an inner wall section of the fluid reservoir provided above the fluid level of the spray fluid in the fluid reservoir by dispensing the second pumped fluid to the inner wall section; an fluid agitating device connected to the backflow system and configured to agitate the spray fluid by dispensing the second pumped fluid into the spray fluid in the fluid reservoir; a further fluid agitating device which is different from the agitating device, connected to the backflow system, and configured to agitate the spray fluid by dispensing the second pumped fluid into the spray fluid in the fluid reservoir; and a refill device connected to the backflow system and configured to provide the refill amount of the second pumped fluid through a refill opening of the fluid reservoir to the fluid reservoir for refilling.

In an example, the first return device may be provided with the reservoir spraying device and the second return device may be provided with the fluid agitating device. The third return device may be provided by the refill device.

Different functions are conducted by the different return devices. The reservoir spraying device and the fluid agitating device are provided as separated device for returning second pumped fluid. The reservoir spraying device is configured to wet one or more inner wall sections of the fluid reservoir, thereby, avoiding the inner wall sections drying in operation. The fluid agitating device and the further agitating device are configured to agitate the spray fluid provided in the fluid reservoir by (pressurized) dispensing the second pumped fluid received from the backflow system into the spray fluid, thereby, e.g. avoiding or limiting segregation of components or ingredients of the spray fluid. The fluid agitating device and the further agitating device may be provided in different locations within the fluid reservoir. For example, the fluid agitating device and the further agitating device may be provided at different levels in the fluid reservoir, with the fluid agitating device located above the further agitating device may be provided. At least one of the of the fluid agitating device and the further agitating device may be provided close to the bottom of the fluid reservoir.

While the reservoir spraying device and the fluid agitating device(s) provide for both refilling of the fluid reservoir and additional functionality (combined functionality), the refill device will provide for plain refilling by conveying the second pumped fluid received by the refill device to the fluid reservoir.

The number of return devices for which the flow of the second pumped fluid is controlled in dependence on the fluid level may be limited to only two, alternatively to only three return devices.

With respect to the spray fluid operation system for an agricultural sprayer, the embodiments disclosed above with respect to the method for operating the spray fluid operation system may be applied mutatis mutandis.

The fluid agitating device may be provided with a plurality of outlets or openings at least partially immersing into the spray fluid in the fluid reservoir, if a sufficient amount of the spray material is in the fluid reservoir, thereby, allowing for pressurized ejection of the second pumped fluid received by the fluid agitating device. The fluid agitating device may be provided in a lower part of the fluid reservoir, for example, in the vicinity of a bottom of the fluid reservoir or in some distance from the bottom.

The reservoir spraying device may be provided in an upper part of the reservoir. The reservoir spraying device may be provided with a plurality of spraying or dispensing elements such as nozzles which are configured to dispense the second pumped fluid received by the reservoir spraying device to the inner wall section(s) for wetting such inner wall section(s).

The pump and control system may be connected to another reservoir receiving a cleaning or rinsing fluid such as water. The pump and control system may be used for pumping such cleaning or rinsing fluid to at least one of the reservoir spraying device and the fluid agitating device for dispensing the cleaning and rinsing fluid to the fluid reservoir which may be empty before from the spray fluid. Such fluid being water may also be provided to the fluid reservoir for diluting the spray material, thereby, increasing a current fluid level of the spray material in the fluid reservoir.

BRIEF DESCRIPTION OF THE DRAWINGS

Following, further embodiments are described by referring to figures. In the figures show.

DETAILED DESCRIPTION OF FURTHER EMBODIMENTS

Figure 1:
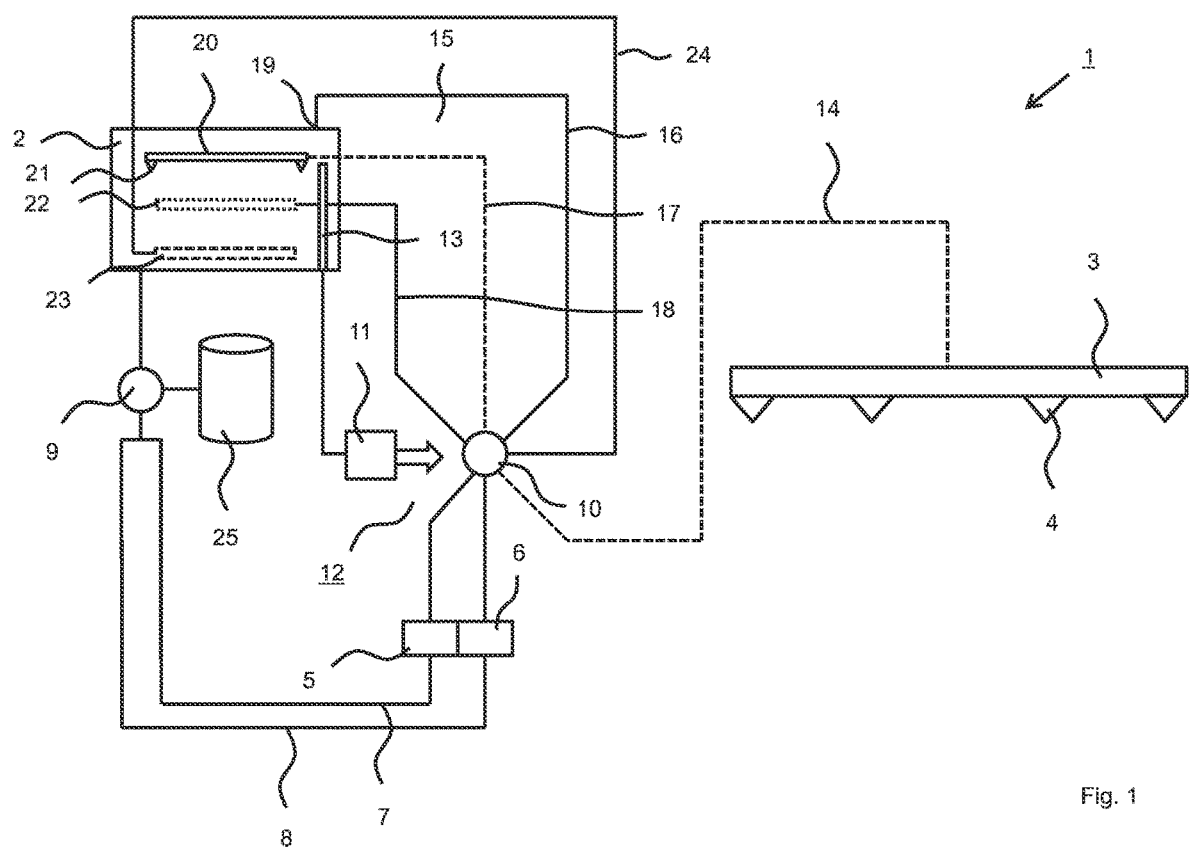
FIG. 1 a schematic representation of a spray fluid operation system for an agricultural sprayer conducting a mode of operation in which a spray fluid is provided to both a dispensing flow system and a backflow system.
Figure 2:
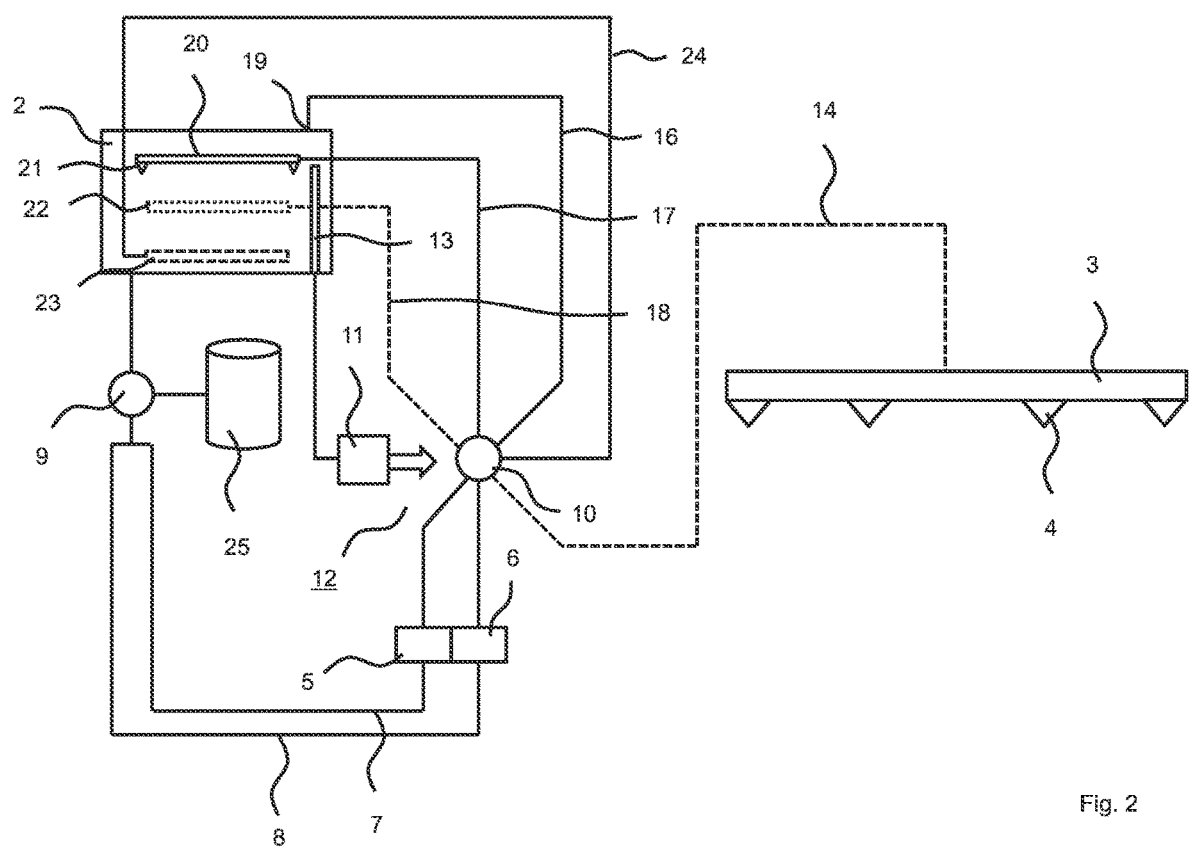
FIG. 2 a schematic representation of the spray fluid operation system from FIG. 1, wherein another mode of operation is conducted providing spray fluid to both the dispensing flow system and the backflow system.
Figure 3:
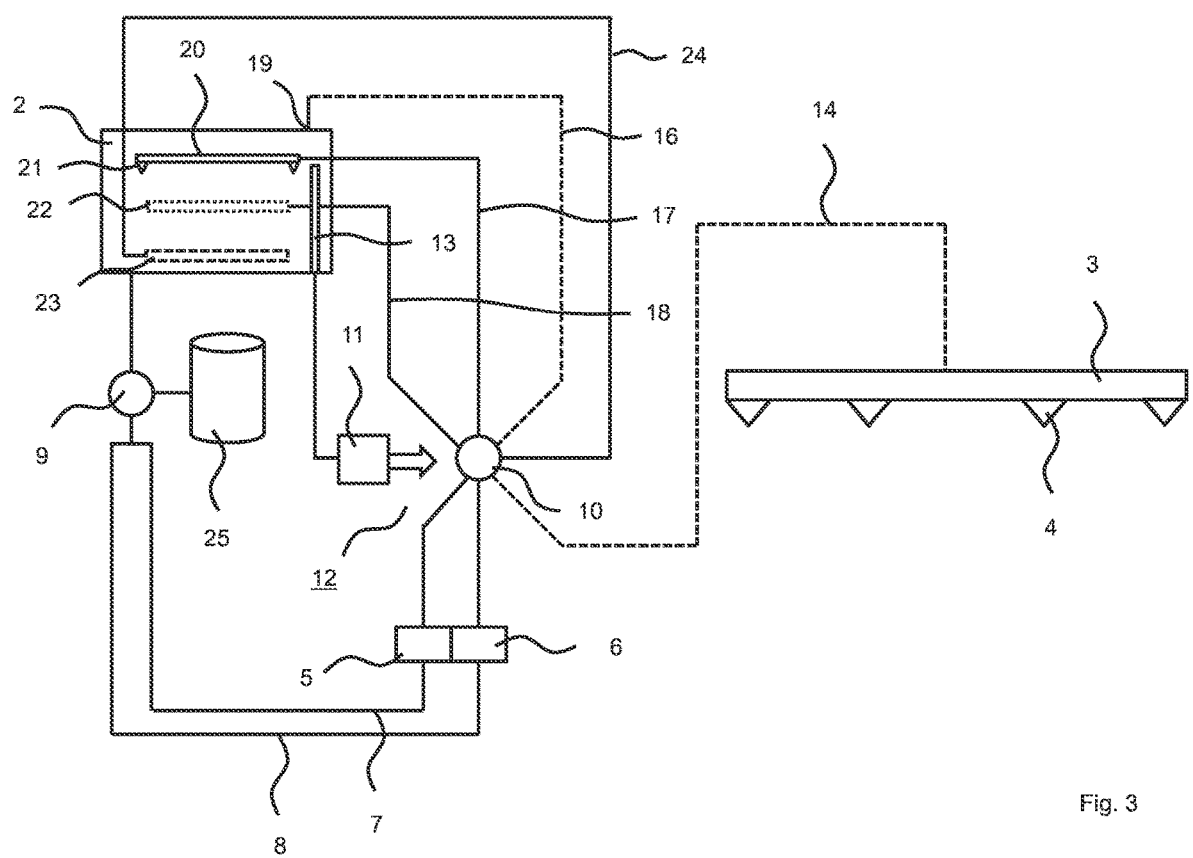
FIG. 3 a schematic representation of the spray fluid operation system from FIG. 1, wherein a further mode of operation is conducted providing spray fluid to both the dispensing flow system and the backflow system.
Figure 4:
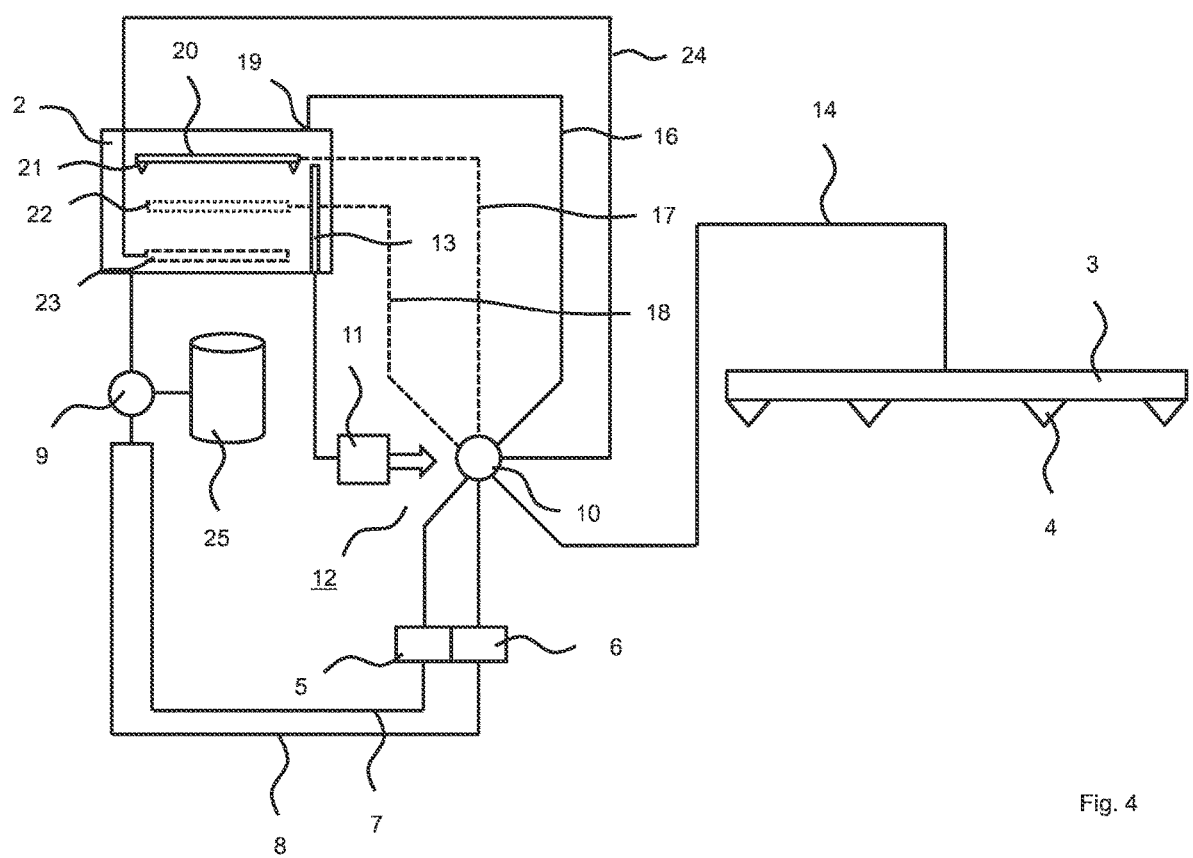
FIG. 4 a schematic representation of the spray fluid operation system from FIG. 1 wherein still another mode of operation is conducted providing spray fluid to the backflow system, but not to the dispensing flow system.

FIGS. 1 to 4 show a schematic representation of a spray fluid operation system 1 conducting different modes of operation.

A fluid reservoir 2 is provided for receiving a spray fluid or material which is to be dispensed for agricultural purpose by an agricultural sprayer (not shown) to the field. The spray fluid is to be dispensed by a dispensing device 3 having a plurality of dispensing elements 4 implemented, for example, by one or more nozzles. The dispensing elements 4 may be provided on a boom of an agricultural sprayer (not shown). Different types of booms are known as such. In an example, the boom may be a circulation spray boom known as such (see, for example, EP 2 979 546 B1). In this case spray fluid provided to the boom in part may be flowing (circulating) back to the fluid reservoir 2.

From the fluid reservoir 2 the spray material is sucked by a first and the second pump device 5, 6 and conveyed through a first and second conveying line 7, 8 connected via a valve 9 to the fluid reservoir 2. The spray fluid conveyed by the first and second pump device 5, 6 is provided to a multi-port valve system 10. Alternatively, a pump device having a single pump may be provided.

Functionality of the multi-port valve system 10 may be provided by a single multi-port valve or a combination or series of valves connected to at least one of the first and second pump device 5, 6.

For the spray fluid operation system 1 shown the first and second pump device 5, 6, the multi-port valve system 10, and a control device 11 are provided in a pump and control system 12 which is configured to generate pumped or conveyed spray fluid and to control allocation of the pumped fluid to different components or sections of the spray fluid operation system 1 via the multi-port valve system 10. According to an example, the control device 11 is connected to a level measuring device 13 assigned to the fluid reservoir 2 for measuring a level for the spray fluid received in the fluid reservoir 2.

The control device 11 may be configured to apply operation control to the multi-port valve system 10 only, but not to the first and second pump device 5, 6. Alternatively, the control device 11 may be configured to apply operation control to the first and second pump device 5, 6 as well.

Through the multi-port valve 10 the pump and control system 12 is connected to a dispensing flow system 14 conveying a first pumped fluid to the dispensing device 3.

Further, the multi-port valve system 10 according to the example shown is connected to a backflow system 15 comprising a refill pipeline 16, a reservoir spraying pipeline 17, and a fluid agitating pipeline 18.

Refill pipeline 16 is connected to a refill device or port 19 for dispensing second pumped fluid received through the multi-port valve system 10 into the fluid reservoir 2.

The reservoir spraying pipeline 17 is connected to a first return device provided, in the example depicted, with a reservoir spraying device 20 located in an upper part of the fluid reservoir 2 and configured to wet an inner wall section of the fluid reservoir 2 by dispensing the second pumped fluid through dispensing elements 21 such as nozzles.

The fluid agitating line 18 is connected to a second return device provided, in the example depicted, with a fluid agitating device 22 and within the fluid reservoir 2 and configured to agitate the spray fluid received in the fluid reservoir 2 by dispensing the second pumped fluid received through the multi-port valve 10 into the spray fluid in the fluid reservoir 2. For example, the fluid agitating device 22 may be provided with a plurality of openings for dispensing the pressurized second pumped fluid into the spray fluid within the fluid reservoir 2, thereby, agitating or supporting mixing of the spray fluid. Alternatively or in addition, an arrangement comprising high pressure jets may be provided for dispensing the fluid into the spray fluid for agitating.

A further fluid agitating device 23 is provided on the bottom or close to the bottom of the fluid reservoir 2, the further fluid agitating device 23 receiving spray material through a further fluid agitating pipeline 24 of the fluid reservoir 2. The further fluid agitating pipeline 24 is connected to the multi-port valve system 10. The further fluid agitating device 23 may be provided with a plurality of openings or outlets for dispensing the spray fluid received through the further fluid agitating pipeline 24 into the fluid reservoir 2. By the further agitating device 23 and the fluid agitating device 22 a main agitating device and an additionally supporting agitating device, respectively, may be provided for avoiding components of the spray fluid segregating in the fluid reservoir 2.

According to the different examples in FIGS. 1 to 4, an operation of the spray fluid operation system 1 at least one of the first and second pumped fluid is generated or conveyed by the pump and control system 12. In FIGS. 1 to 4 dashed lines represent pipelines which are operated with flowing pumped fluid in the different modes of operation.

For example, in FIG. 1 the first pumped fluid provided is generated and provided through the dispensing pipeline 14 to the dispensing device 3. At the same time the second pumped fluid is exclusively conveyed to the reservoir spraying device 20 for wetting inner wall sections of the fluid reservoir. There is no second pumped fluid provided to either one of the fluid agitating device 22, the further agitating device 23, and the refill device 19.

In a different mode of operation, according to FIG. 2, the second pumped fluid is conveyed to the further fluid agitating device 23 only, but not to the reservoir spraying device 21, the further agitating device 23, and the refill device 19.

According to still another mode of operation, referring to FIG. 3, the second pumped fluid is conveyed to the refill device 19, but not to the reservoir spraying device 21, the fluid agitating device 22, and the further agitating device 23. The different modes of operation for providing the second pumped fluid to either one of the refill device 19, the reservoir spraying device 21, the fluid agitating device 22, and the further agitating device 23 may be conducted without having the first pumped fluid provided to the dispensing device 3. Alternatively, any spray fluid received from the fluid reservoir 2 by the pump and control system may be provided to the dispensing flow system 14 for dispensing by the dispensing device 3.

Referring to FIG. 4, a mode of operation is depicted without the first pumped fluid conveyed to the dispensing system. The second pumped fluid is provided to both the reservoir spraying device 21 and the fluid agitating device 22.

For filling the fluid reservoir 2 with fresh or additional (spray) fluid different from the pumped fluid returned to the fluid reservoir 2, a filling line (not shown) may be connected, for example, to the valve 9 or one of the fluid agitating pipeline 18 and the further fluid agitating pipeline 23. If the filling line is connected to the valve 9, the fluid is conveyed through the pump and control system 12 to the fluid reservoir 2, for example, via the fluid agitating pipeline 18 and the further fluid agitating pipeline 23. In an example, the filling line may be connected to the refill device or port 19.

With respect to all or some of the different modes of operation explained above, such mode may be applied in dependence on the fluid level of the spray fluid in the fluid reservoir 2 measured by the level measuring device 13 For example, referring to FIG. 4, the amount of the second pumped fluid provided to the reservoir spraying device 20 and the amount of the second pumped fluid provided to the fluid agitating device 22 may depend on the fluid level determined by the level measuring device 13. Regarding the different amounts of second pumped fluid, different ratios of allocation apply in dependence on the level of the fluid in the fluid reservoir 2. For example, the second pumped fluid may be exclusively allocated to the reservoir spraying device 20 (allocation ratio 0/100%), if the fluid level of the spray fluid in the fluid reservoir is determined to be below the location of the fluid agitating device 22. In another example, the second pumped fluid may be exclusively conveyed to the fluid agitating device 22 (allocation ratio 100/0%), if it is determined that the fluid level of the spray fluid in the fluid reservoir 2 is in close distance with the location of the reservoir spraying device 20 in the upper part of the fluid reservoir 2. Controlling of the allocation ratio may be conducted based on the fluid level detected as such without referring to the location of one of the reservoir spraying device 20 and the fluid agitating device 22 relative to the fluid level.

According to the examples depicted in FIGS. 1 to 4, controlling of the flow of the pumped fluid into at least one of the dispensing flow system 14 and the backflow system 15 is controlled by the multi-port valve 10. Alternatively, a plurality of pump devices (not shown) may be provided which are controlled by the control device 11 for directly providing pumped fluid to each of the different lines: dispensing line 14, refill pipeline 16, reservoir spraying pipeline 17, fluid agitating pipeline 18, and further fluid agitating pipeline 24.

The valve 9 is fluidly connected to another reservoir receiving 25 receiving an additional fluid different from the spray fluid, the additional fluid may provide for a cleaning or rinsing fluid such as water. The pump and control system 12 may be used for sucking or pumping the additional fluid to at least one of the reservoir spraying device 20 and the fluid agitating device 22 for dispensing the cleaning and rinsing fluid to the fluid reservoir 2 which may be empty before from the spray fluid. Such additional fluid being, for example, water may also be provided to the fluid reservoir for diluting the spray material, thereby, increasing a current fluid level of the spray material in the fluid reservoir 2.

In the controlling of operation as described above, the second pumped fluid may comprise only spray fluid from the spray fluid reservoir 2, thereby, providing a second pumped spray fluid. Alternatively, in other examples, the second pumped fluid may comprise only the fluid from the additional reservoir 25. Alternatively, the second pumped fluid may be a mixture of the spray fluid and the fluid from the additional reservoir.

The first pumped fluid may comprise only spray fluid from the spray fluid reservoir 2, thereby, providing a first pumped spray fluid. Alternatively, the first pumped fluid may comprise only the fluid from the additional reservoir 25. Such fluid may provide for diluting the spray fluid in an example. Alternatively, the first pumped fluid may be a mixture of the spray fluid and the fluid from the additional reservoir.

Thus, the spray fluid operation system 1 is configured to control application of at least one of the spray fluid from the spray fluid reservoir 2 and the fluid from the additional reservoir 25 in the different modes of operation.

The features disclosed in this specification, the figures and/or the claims may be material for the realization of various embodiments, taken in isolation or in various combinations thereof.

The invention claimed is:

1. A method for operating a spray fluid operation system for an agricultural sprayer, comprising
   providing a spray fluid in a fluid reservoir;
   conveying a fluid comprising at least one of the spray fluid from the fluid reservoir and an additional fluid different from the spray fluid and provided in an additional fluid reservoir into a fluid flow system by a pump and control system, the fluid flow system comprising
      a dispensing flow system comprising a dispensing device having a plurality of dispensing elements configured to dispense a first pumped fluid received from the pump and control system to a field, and
      a backflow system fluidly connected to the fluid reservoir and configured to pipe second pumped fluid received from the pump and control system back to the fluid reservoir;
   determining a fluid level of the spray fluid in the fluid reservoir by a level measuring device;
   receiving measurement data in a control device, the measurement data being indicative of the fluid level determined by the level measuring device;
   generating the second pumped fluid by the pump and control system; and
   controlling, by the control device, allocation of at least part of the second pumped fluid according to an allocation ratio dependent on the fluid level to
      a first return device connected to the backflow system and configured to return the second pumped fluid to the fluid reservoir; and
      a second return device connected to the backflow system and configured to return the second pumped fluid to the fluid reservoir.

2. The method of claim 1, further comprising, in the control device,
   providing threshold data indicative of a threshold fluid level of the spray fluid in the fluid reservoir; and
   applying at least one of
      allocating the second pumped fluid according to the first control mode of operation, if the first fluid level is higher than the threshold fluid level; and
      allocating the second pumped fluid according to the second control mode of operation, if the second fluid level is lower than the threshold fluid level.

3. The method of claim 1, wherein the controlling by the control device is further comprising at least one of
   in the first control mode of operation, according to the first allocation ratio allocating an amount of the second pumped fluid to the first return device and allocating another amount of the second pumped fluid smaller than the amount of the second pumped fluid to the second return device; and
   in the second control mode of operation, according to the second allocation ratio allocating an amount of the second pumped fluid to the second return device and allocating another amount of the second pumped fluid smaller than the amount of the second pumped fluid to the first return device.

4. The method of claim 3, wherein the controlling by the control device is further comprising at least one of
   in the first control mode of operation, preventing the second pumped fluid from allocating to the second return device; and
   in the second control mode of operation, preventing the second pumped fluid from allocating to the first return device.

5. The method of claim 1, further comprising allocating an amount of the second pumped fluid to a third return device connected to the backflow system and configured to return the second pumped fluid to the fluid reservoir return the second pumped fluid to the fluid reservoir.

6. The method of claim 1, further comprising
   generating the first pumped fluid by the pump and control system;
   providing the first pumped fluid to the dispensing flow system; and
   dispensing the first pumped fluid by the plurality of dispensing elements to the field.

7. The method of claim 6, further comprising stopping at least one of generating the first pumped fluid and generating the second pumped fluid, if the measurement data are indicative of a lower limit for the fluid level in the fluid reservoir.

8. The method of claim 1, wherein the controlling of the allocation of at least part of the second pumped fluid further comprises, by the control device,
   controlling operation of a first pump device of the pump and control system, the first pump device configured to provide the second pumped fluid to the first return device; and
   controlling operation of a second pump device of the pump and control system, the second pump device configured to provide the second pumped fluid to the second return device.

9. The method of claim 1, wherein the controlling of the allocation of at least part of the second pumped fluid further comprises, by the control device, controlling a multi-port valve system, wherein a valve inlet of the multi-port valve is configured to receive the second pumped fluid from the pump and control system and a valve outlet of the multi-port valve system is configured to provide the second pumped fluid to at least one of the first return device and the second return device.

10. The method of claim 5, wherein the first, second and third return devices are selected from the following group of return devices:
   a reservoir spraying device connected to the backflow system and configured to wet an inner wall section of the fluid reservoir provided above the fluid level of the spray fluid in the fluid reservoir by dispensing the second pumped fluid to the inner wall section;
   an fluid agitating device connected to the backflow system and configured to agitate the spray fluid by dispensing the second pumped fluid into the spray fluid in the fluid reservoir;
   a further fluid agitating device connected to the backflow system and configured to agitate the spray fluid by dispensing the second pumped fluid into the spray fluid in the fluid reservoir; and
   a refill device connected to the backflow system and configured to provide the refill amount of the second pumped fluid through a refill opening of the fluid reservoir to the fluid reservoir for refilling.

11. An agricultural sprayer comprising a spray fluid operation system, the spray fluid operation system comprising
   a fluid reservoir configured to receive a spray fluid;
   a pump and control system configured to convey a fluid comprising at least one of the spray fluid from the fluid reservoir and an additional fluid different from the spray fluid and provided in an additional fluid reservoir into a fluid flow system, comprising
   a dispensing flow system comprising a dispensing device having a plurality of dispensing elements configured to dispense a first pumped fluid received from the pump and control system to a field, and
   a backflow system fluidly connected to the fluid reservoir and configured to pipe second pumped fluid received from the pump and control system back to the fluid reservoir;
   a first return device connected to the backflow system and configured to return the second pumped fluid to the fluid reservoir;
   a second return device connected to the backflow system and configured to return the second pumped fluid to the fluid reservoir;
   a level measuring device configured to determine a fluid level of the spray fluid in the fluid reservoir; and
   a control device;
   wherein the spray fluid operation system configured to
   receive measurement data in the control device, the measurement data being indicative of the fluid level determined by the level measuring device;
   generate the second pumped fluid by the pump and control system; and
   control, by the control device, allocation of at least part of the second pumped fluid according to an allocation ratio dependent on the fluid level to the first return device, and the second return device.

12. A method for operating an agricultural sprayer of claim 11,
   comprising operating the spray fluid operation system according to the method of claim 1.

* * * * *